United States Patent [19]

Masuda

[11] Patent Number: 4,517,785

[45] Date of Patent: May 21, 1985

[54] AUTOMATIC CONFECTIONARY-AND-LIKES MANUFACTURING EQUIPMENT

[75] Inventor: Fumihiko Masuda, Tokorozawa, Japan

[73] Assignee: Shin Nihon Machine Manufacturing Co., Ltd., Saitama-ken, Japan

[21] Appl. No.: 346,709

[22] Filed: Feb. 8, 1982

[51] Int. Cl.³ .................. B65B 11/10; B65B 63/04
[52] U.S. Cl. ........................ 53/116; 53/209; 53/211; 53/240; 99/450.6; 426/297
[58] Field of Search .......... 53/429, 430, 465, 211, 53/216, 209, 213, 116, 587, 240; 493/112, 388; 99/450.2, 450.6; 425/319, 320; 426/297, 500, 501, 502

[56] References Cited

U.S. PATENT DOCUMENTS

| 1,123,606 | 1/1915 | Smith | 53/528 |
|---|---|---|---|
| 1,397,981 | 11/1921 | Peters | 99/450.2 |
| 1,792,443 | 2/1931 | Peters | 426/501 |
| 2,157,949 | 5/1939 | Benz | 53/228 |
| 2,627,236 | 2/1953 | Angell | 53/216 X |
| 2,651,900 | 9/1953 | Heilman | 53/588 |
| 2,961,814 | 11/1960 | Redmond | 53/225 |
| 3,097,464 | 7/1963 | Reeves | 53/116 X |
| 3,099,118 | 7/1963 | Stelling | 53/209 |
| 3,135,078 | 6/1964 | Keene | 53/216 X |
| 3,669,007 | 6/1972 | Pullici | 99/450.6 |
| 3,912,433 | 10/1975 | Ma | 99/450.6 |
| 4,073,953 | 2/1978 | Trostmann | 426/502 X |
| 4,247,564 | 1/1981 | Tezuka | 53/430 X |
| 4,321,858 | 3/1982 | Williams | 99/450.6 X |

Primary Examiner—John Sipos
Attorney, Agent, or Firm—Sughrue, Mion, Zinn, Macpeak & Seas

[57] ABSTRACT

The equipment of the present invention is one used in preparation of confectionary, cakes and other sweets of western and oriental fashion as well as of the Japanese fashion. Regardless of whether the viscosity of the materials is high or low, they can be disposed of in the manner of becoming easy to handle. When to bake them, they, in the state of raw material or contents, are wrapped in a heat-resistant film, which, rolled back, is continuously fed. Thus, if the raw material is baked into a desired product, its process is sanitary and efficient, and that inexpensive.

2 Claims, 15 Drawing Figures

AUTOMATIC CONFECTIONARY-AND-LIKES MANUFACTURING EQUIPMENT

BACKGROUND OF THE INVENTION

1. Field of the Invention

The present invention relates to automatic manufacturing equipment for confectionary and the like.

2. Description of the Prior Art

Conventionally used raw materials for western confectionary native cakes, and fish- or meat-mixes, contain water and have viscosity, so that they have the difficulty to form and process.

Hence, in preparation of processed foods such as western cakes, hamburgers and etc., manual operations have heretofore been dominant, resulting in making the work increasingly complicated, the sanitation all the more aggravated, and the prices of products more and more expensive.

In other words, when forming a viscous raw material, for example, by the use of patterns, the raw material attaches to the patterns so that it does not suit mechanization or automation of processing with such raw material. Also, in the forming process, dust or bacteria is liable to get into the raw material from the hands of operators, in addition to the undesirable foreign matters mixing into the raw material from the patterns or apparatus, and such processing is extremely unsanitary. And, even after the forming operation, as the products are left exposed for a considerable time until they are packed, they cannot avoid the attaching of dust and impurities, so that they easily decompose, and as their preservability is extremely poor, they have to be disposed of as early as possible from the necessity of food sanitation. Further, in the conventional discontinuous manual operation system, as such processes as the forming and baking of raw material and packing of products are conducted discontinuously or separately, production costs cannot but be increased. Also the space of productive facility has to be expanded, and thus naturally the product prices cannot avoid an increase.

SUMMARY OF THE INVENTION

It is therefore an object of the present invention to provide automatic confectionary manufacturing equipment which is free from the abovesaid defects experienced in the past.

According to the present invention, since products are prepared based on processing the raw material as wrapped from the first, the preparation in no wise involves exposition in handling the raw material as well as baking, so that there is no problem even from the viewpoint of sanitation.

In accordance with an aspect of the present invention, the automatic confectionary manufacturing equipment comprises at least one first raw material laying device to lay a raw material on a heat-proof film continuously fed in a rolled-back state; at least one confectionary laying device disposed adjacent to the first raw material laying device in the direction of travel of the abovesaid film to lay contents on the raw material; and a wrapping device for wrapping the surroundings of the contents with the said raw material while at the same time packing the outside of the said rawmaterial-wrapped contents with the said film.

In accordance with another aspect of the present invention, the automatic confectionary manufacturing equipment comprises a cutting device for cutting a rolled-back, continuously fed heat-resistant film in its widthwise direction; at least one first raw material laying device for laying a raw material on the said out film; at least one second raw material laying device for laying the contents on the raw material, said device being located in contiguity to the first raw material-laying device in the direction of feed of the previously cut film; a holding device which holds and transfers the postcut film from the aforementioned first raw material-laying, contents-laying, and the second-raw material-laying devices; a wrapping device which wraps raw material, contents and raw material, by bending at least one side of the said film in the direction of the said out film being fed, into a cylindrical body; and a bend-sealing device designed to bend inwardly both ends of the said cylindrical body.

Accordingly, the present invention is designed to provide equipment for cutting contents, raw material and etc., and wrapping them with a film automatically. The ends of the aforesaid cylindrical body are designed to be partly foldable inwardly and they are sealed by pressing from above and beneath. As the sealed part can be constituted in a state of perfect sealing and lies in the position on the center axis of cylindrical body, even if pressed by a large amount of vapor generated in the interior by heating, it is in no wise breakable by the pressure of the vapor.

Furthermore, the raw material of high viscosity is wrapped with film in a desired form before baking it, so that the raw material is handled in an extremely handy manner. Besides, the preparation processes are consistently automatable and the raw material is least exposable to contaminative environment during preparing operations, and so the employment of such raw material is highly sanitary.

DESCRIPTION OF THE PREFERRED EMBODIMENTS

Figure 1:
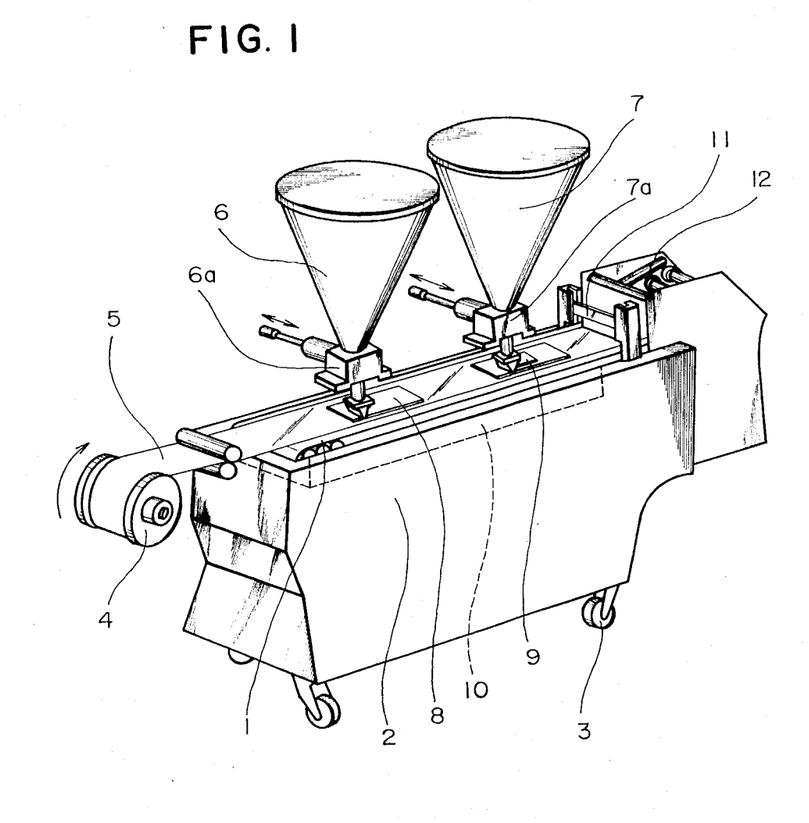
FIG. 1 is a general perspective view showing automatic confectionary manufacturing equipment according to an embodiment of the present invention.

In FIG. 1, reference numeral 1 indicates a moving track such as a belt, chain, roller, etc., and particularly in case it is designed to constitute as an endless track using a belt, chain or the like, the track is continuously driven via rollers. This moving track 1 is usually fixed to a frame 2 movable on wheels 3. At one end of the track 1 are disposed a film supply reel 4 on which a belt-like film, e.g., heat-resistant film is wound. From said supply reel 4 is rolled back film 5 which is extended on to the track 1. For this film commonly aluminum foil is used, but any material having resistance can be used as the film, e.g., even a heat-resistant transparent film.

Figure 2A:
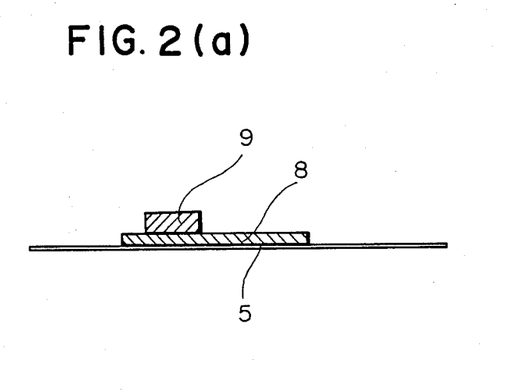
FIG. 2(a) is explanatory of the disposition of raw material and contents, etc. in the equipment of FIG. 1.

Then, having the film 5 transferred on the track 1, dispose in its space at least one first raw material laying device 6 and at least one contents laying device 7. Both of these devices 6 and 7 are commonly constituted hopper-like, below which are set two sluice valves 6a and 7a from which raw material and contents are supplied in desired forms. Namely, as shown in FIG. 2(a), from the first raw material laying device 6, raw material 8 such as flour or the like is pushed out on the film 5, followed by contents 9 such as, e.g., (Japanese bean jam) and being pushed out from the contents laying device 7, which is placed on the raw material 8.

Figure 2B:
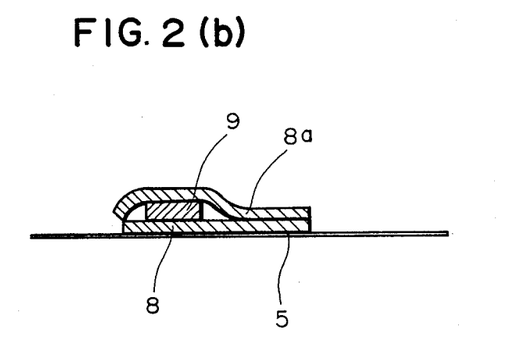
FIG. 2(b) shows the disposition of raw material, contents, etc. in another embodiment of the present invention.
Figure 3:
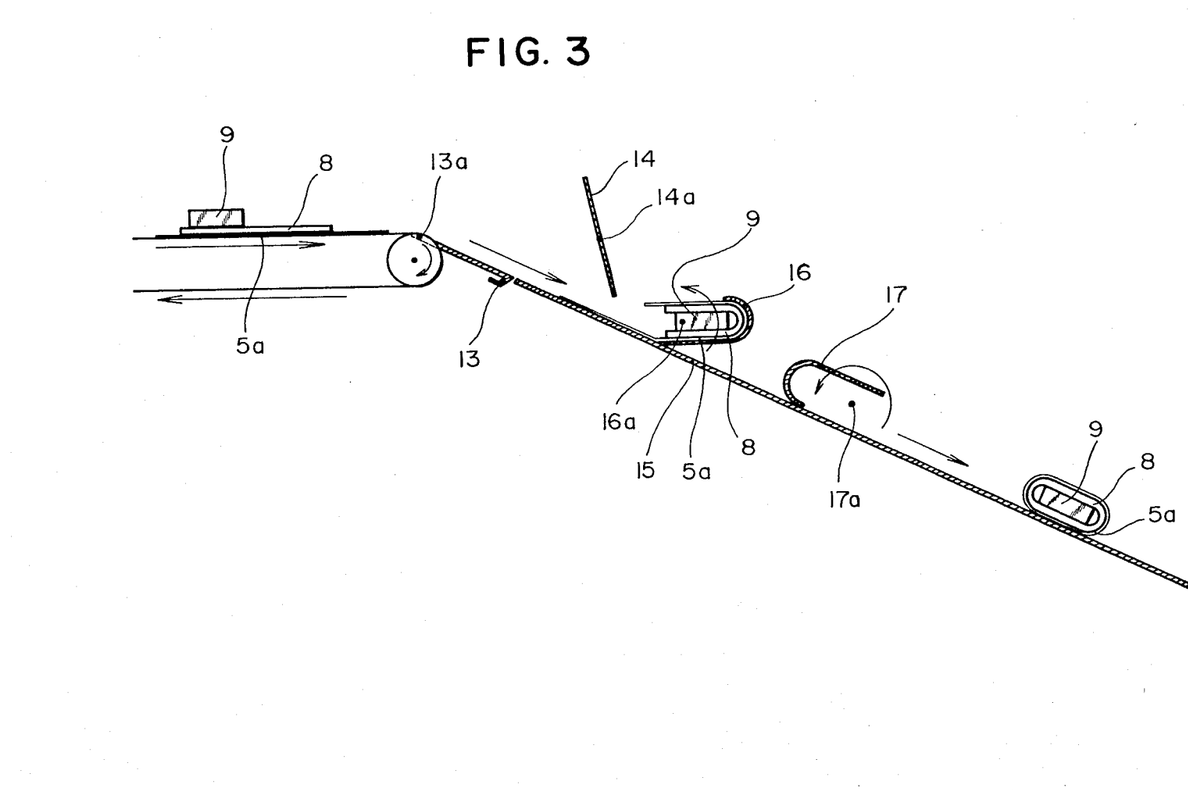
FIGS. 3, 4, 5 and 6 are similar schematic elevational views which show the operative state of a wrapping device employed in the present invention.
Figure 4:
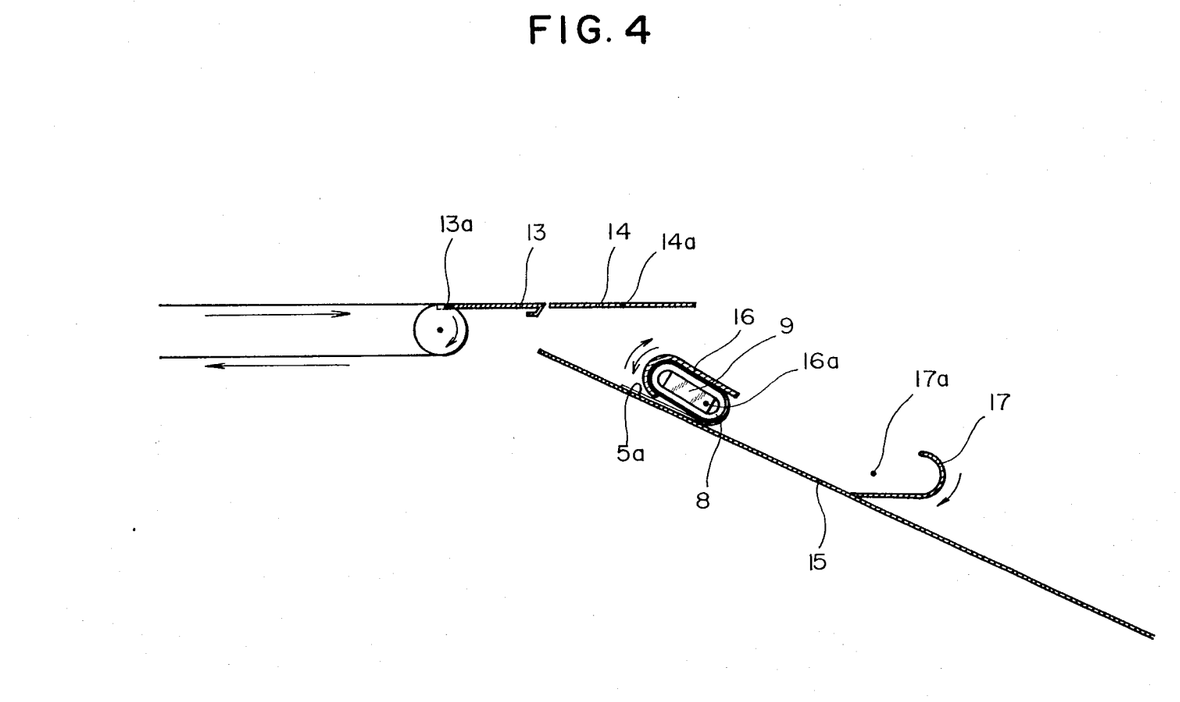
Figure 5:
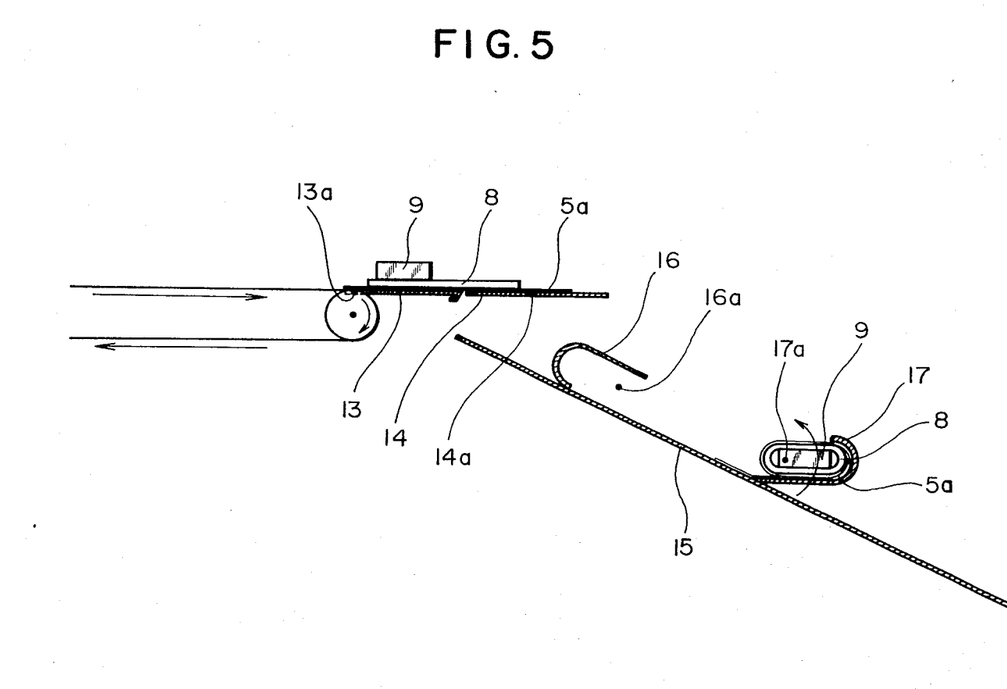

Further, in some cases raw material 8a is placed on the contents 9 which is prior placed on raw material 8 as shown in FIG. 2(b), and although not illustrated here, a second raw material laying device may be provided in FIG. 1, in order to supply the raw material 8a.

In either case, it is important that the film 5 be held securely not to get out of its proper position. For this purpose, a wind box 10 is provided as a position-holding mechanism which is constituted in the wind box surface being contacted with by the movings track 1 possessing many pores through which film 5 is attracted by air pressure and securely held.

With such an arrangement, the position relations between the contents 9 and the raw material 8 are retained when in the wrapping device, to wrap the content 9 with raw material 8, by the wrapping device and simultaneously wrapping the raw material 8 with the film 5, accurately, while restricted. And also, even though the film 5, after the film 5 being cut following the laying of the contents 9 and the raw material 8, has become tension-free, as it has become attached to the moving track 1 owing to the wind box, the accurately controlled position relations between the film 5 and the moving track 1 cannot be dislodged.

Then, a film cutting device 11 is set contiguous to the contents laying device 7, and the film 5, after being cut for each raw material, moves to a wrapping device 12, by which the contents 9 is wrapped by raw material 8, and simultaneously the surroundings of the raw material 8 are wrapped by the cut film 5a. The wrapping device can be constituted in any mode such as illustrated in FIGS. 3 to 6 but can also be formed as shown in FIG. 7.

Figure 6:
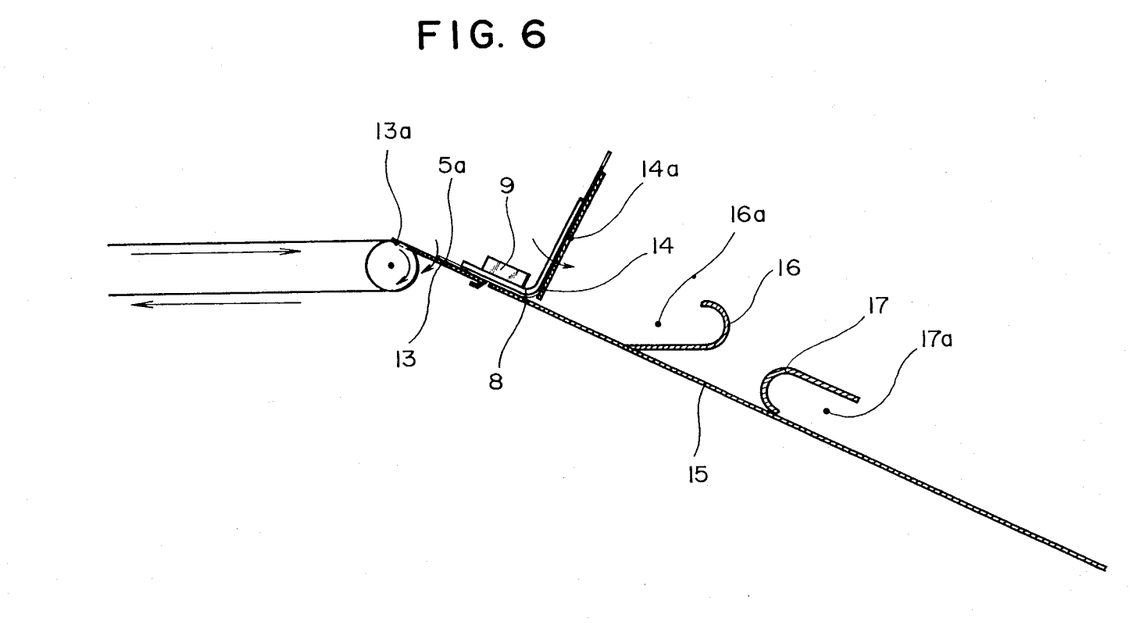

The wrapping device 12 as shown in FIGS. 3 to 6 is intended for wrapping the raw material and contents by bending the marginal edge in the direction of feed of the cut film 5a. Accordingly, this wrapping device is provided with an oscillating plate 13 and a rotary plate 14 thereby transferring the cut film 5a, then to reach them as shown by FIG. 6. The oscillating plate 13 rotates about a pivot 13a and the rotary plate 14 rotate about a rotary shaft 14a; particularly, the cut film 5a and the raw material 8, as shown in FIG. 6, have their end edges bent by the rotary plate 14; and in the end, they are bent almost normally about the portion at the contents 9. With the rotary plate 14 rotating further and as it reaches the state shown in FIG. 3, the rotary plate 14 and oscillating plate 13 become separated from each other resulting in creating a passage therebetween, so that the raw material 8, in the state of its end edge having been bent, descends along an inclined plate 15 and move into a first forming plate 16. The raw material is sustained in the state illustrated in FIG. 3 by the forming plate 16. The first forming plate 16, rotating counter clockwise about a pivot 16a reaches the state shown in FIG. 4, when the semiproduct is discharged, and transferred, along the inclined plate 15, to a second forming plate 17. The second forming plate 17 is built up like the first forming plate 16. The second forming plate 17 is designed, also like the first forming plate 16, turning counterclockwise, and rotates about a pivot 17a. The cut film 5a, further bent, completely wraps the raw material and contents and simultaneously with the contents being wrapped by the raw material in the state of being packed by the cut film, is discharged from the open space at the rear end of the second forming plate 17.

Again, the wrapping device is constituted in the manner of the contents being wrapped by the raw material by bending the cut film 5a from leading end edge. Instead however, it can be constituted so as to wrap the raw material and contents by erecting only the side edge of the cut film 5a. Such constitution of the wrapping device enables high-speed wrapping. It is also possible to connect the wrapping device in series to the sealing device.

Figure 7:
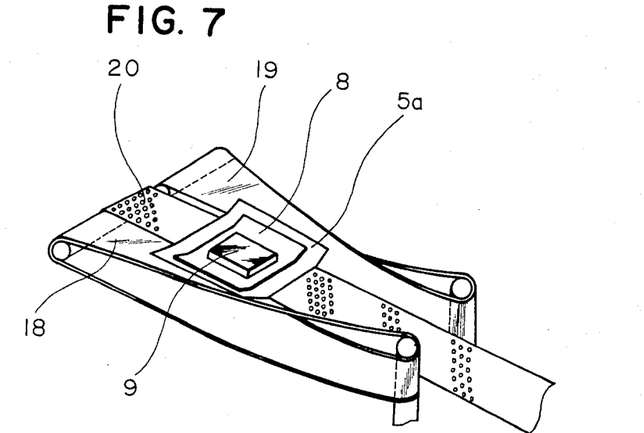
FIG. 7 is a perspective view which in explanatory of the principle of a wrapping device in another embodiment of the present invention.
Figures 8, 9:
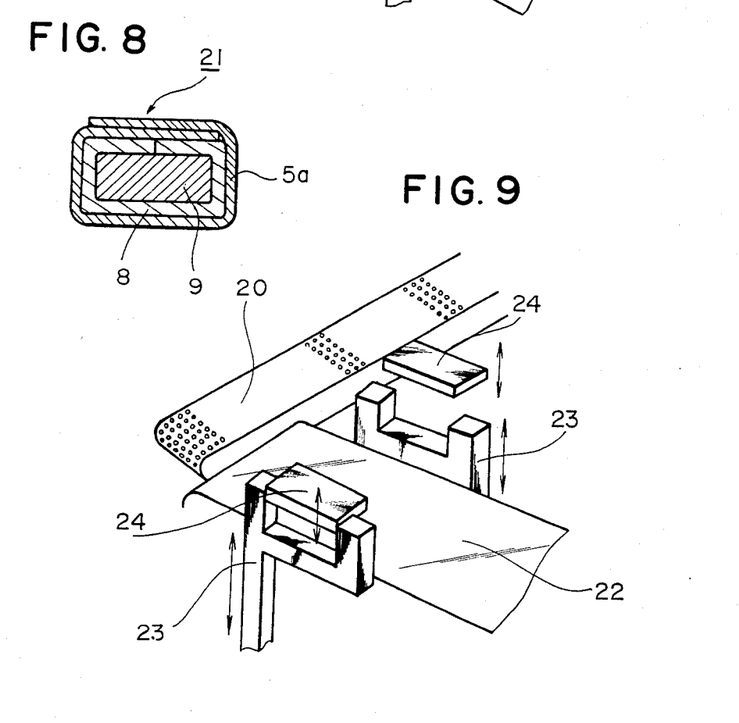
FIG. 8 is a sectional view of a cylindrical body wrapped in such a form of raw material, contents, etc. by a cut film.
FIG. 9 is a general perspective view showing an embodiment of a sealing device employed in the present invention.

FIG. 7 is a general perspective view that reveals the principle of the wrapping device in accordance with another embodiment of the present invention. A connection of the wrapping device to the previously said moving track 1 provides a second moving track 20, whose breadth is restricted to an extent which sustains only the laying of the raw-material, contents, etc. on the cut film 5a. So, if the second moving track 20 is constituted of a belt having pores as in the case of the moving track 1, the cut film 5a will attracted and held on the second moving track 20 only at the part bearing the raw material 8 and contents 9 through the suction pressure at the pores, so that the other portions of the cut film 5a, that is, the side edge portions is so-called free. On both sides of the second moving track 20 are provided belt conveyors 18 and 19, and while the end portions of 18 and 19 maintain themselves in a horizontal state, the other end portions are held vertical. In other words, the respective conveyors 18 and 19 stand up in turn along the direction of advance of the second moving track 20 from horizontal to verticality while the side portions, which are in a free state in the cut film 5a, advances with the second moving track 20, and they are set up vertically by the conveyors 18 and 19, and wrapped cylindrically as shown in FIG. 8. Incidentally, if guide members (not shown) are provided, in place of the belt conveyor (as shown in FIG. 7), which have been bent from a horizontal to a vertical state along both sides of the second moving track 20, they could achieve the same effect.

As described above, the raw material 8 and the contents 9 are wrapped by the cut film 5a using the wrapping device to obtain a cylindrical body 21 having its both ends open (FIG. 8). In the cases of forming the cylindrical body 21 through the use of the wrapping devices shown in FIG. 7, as the side edges of the cut film 5a is bent, the cylindrical body 21 is turned 90° and transferred via a third moving track 22 to a sealing device shown in FIGS. 9, 10(a), 10(b), 10(c) and 10(d). On the contrary in the case of the wrapping device of FIGS. 3, 4, 5 and 6 as the marginal edge of the cut film 5a are bent, the cylindrical body 21 is not turned and transferred via the third moving track 22 to the sealing device depicted in FIGS. 9, 10(a), 10(b), 10(c) and 10(d).

In the sealing device, receptacles 23, for example, U-shaped in cross section, are disposed on either side of the third moving track in manner to be movable up and down and the width of the third moving track is selected smaller than the length of the cylindrical body 21 to be sealed so that while the cylindrical body 21 is transferred on the third moving track, and its both open end portions project out therefrom. As the mechanism for moving up and down, the receptacle is constituted by a mechanical crank mechanism but it may be electrical drive means. Above the receptacles 23 are provided press pieces 24, which are formed so that they may be arranged on the receptacles 23.

Figure 10A:
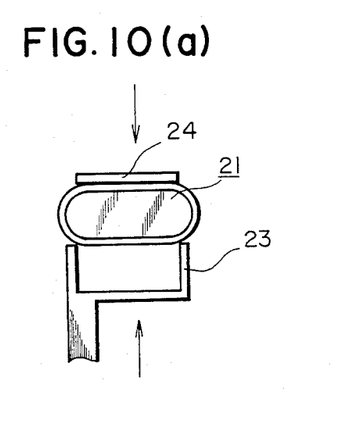
FIG. 10(a) is a diagramatic view explanatory of a first step operation of the sealing device of FIG. 9.
Figure 10B:
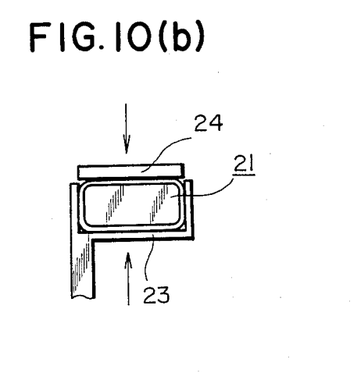
FIG. 10(b) is a diagramatic view explanatory of a secondary step operation of the device of FIG. 9.
Figure 10C:
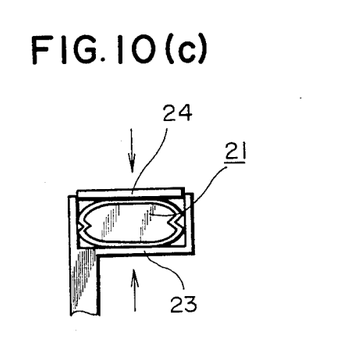
FIG. 10(c) is explanatory of a third step operation of the device of FIG. 9.
Figure 10D:
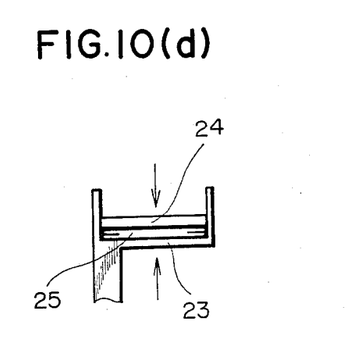
FIG. 10(d) is a diagramatic view explanatory of a fourth step operation of the device of FIG. 9.

With the sealing device comprising the third moving track, the receptacles arranged on the both sides thereof and the press pieces, both end portions of the cylindrical body 21 are pressed by the press pieces 24 (as illustrated at FIG. 10(a)) and then gripped between the receptacles 23 and the press pieces 24 (as shown at FIG. 10(b)) and sealed. During this sealing, both end portions are partly bent inwardly (as illustrated at FIG. 10(c)) to constitute a rigid sealed portion 25 (as shown at FIG. 10(d)).

By bending the sealed portion 25 backwardly, after sealing the cylindrical body by bending its open end portions partly inwardly as described above, the cylindrical body can be sealed with ease.

The cylindrical body thus sealed is placed in a furnace for baking. In this case, it does not matter whether the furnace is a continuous or interrupted baking furnace. Since the film wrapping the raw material is heatproof, excellent baking can be achieved.

Figure 11:
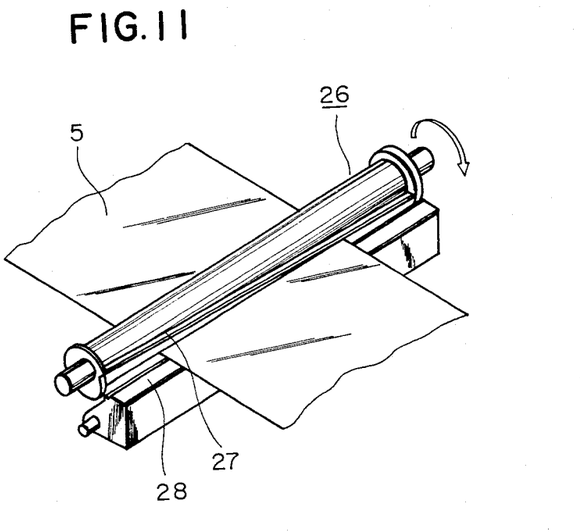
FIG. 11 is a perspective view of a rotary cutter employed in the equipment of the present invention.

While in the foregoing the raw material and the contents are laid on the film rolled back from the film supply reel and then the continuously-fed film is cut in its widthwise direction for each raw material, but it is also possible to cut the film before laying the raw material and the contents. In this case, cutter 26 is disposed with its cutter edge 27 at a slant to its axis as shown in FIG. 11 so that the film 5 is cut at high speed between the cutter edge 27 and a fixed blade 28.

It will be apparent that many modifications and variations may be effected without departing from the scope of the novel concepts of the present invention.

What is claimed is:

1. An automatic confectionary or like manufacturing equipment comprising;
    a generally horizontal, porous moving track for feeding a heat-resistant continuous film horizontally thereon from a first end to a second end;
    at least one raw material laying device for depositing confectionary raw material on said continuous film, and overlyaing said moving track;
    at least one contents laying device for supplying contents on deposited raw material, said contents laying device overlying said moving track and disposed contiguous to said raw material laying device, downstream in said film moving direction;
    a film cutting device for cutting said continuous film after deposition of said raw material and said contents on said film, said film cutting device being disposed contiguous to said contents laying device, and being in juxtaposition to said moving porous track, downstream in said film moving direction from said contents laying device;
    a position holding device for holding said continuous film and said cut film in proper position while moving on said porous moving track, said position holding device comprising a wind box underlying said porous moving track for applying suction pressure through said porous moving track against said continuous film and said cut film;
    a wrapping device in juxtaposition to said porous moving track and downstream therefrom for surrounding said contents with raw material and simultaneously wrapping said raw material with said cut film, said wrapping device being disposed contiguous to said film cutting device, and downstream in the film moving direction therefrom;
    said wrapping device comprising an oscillating plate pivoted at an upstream end for pivoting about a horizontal axis in the plane of said porous moving track and at the downstream end of said track between a first horizontal position in line with said porous moving track and a second position inclined downwardly from the horizontal at an inclined angle thereto;
    a downwardly inclined stationary plate positioning contiguous to said oscillating plate and acting an extension thereof when said oscillating plate is pivoted from the horizontal position to a downwardly inclined position;
    a rotary plate pivoted at its center, overlying said downwardly inclined plate and pivotable from a first position in line with said oscillating plate and being horizontal as an extension of said oscillating plate and said porous moving track to a position at right angles to said downwardly inclined stationary plate to partially wrap said contents;
    and at least one forming plate of U-shaped configuration, means for rotatably mounting said at least one forming plate about a horizontal axis, positioned above said downwardly inclined plate and having a straight portion extending from an arcutate portion terminating in an edge contactable with the top of said downwardly inclined plate so as to receive under gravity movement said cut film and said raw material partially wrapped about said contents and for facilitating further wrapping thereof prior to gravity discharge from said U-shaped forming plate as said forming plate rotates about said horizontal pivot axis.

2. The automatic confectionary or like manufacturing equipment as claimed in claim 1, wherein said at least one forming plate comprises first and second forming plates of identical configuration and positioned overlying the downwardly inclined stationary plate, each of said forming plates being mounted for pivoting about horizontal axes, and being spaced from each other in the downstream direction such that the partially wrapped cut film raw material and contents after partial wrapping in the first forming plate, slides by gravity out of said first forming plate, downwardly along the downwardly inclined plate and into the U-shaped second forming plate; whereupon, rotation of said second forming plate about its horizontal pivot axis effects completed wrapping of said cut film and raw material about said contents prior to gravity release of said confectionary after wrapping from said second forming plate for further gravity movement along said downwardly inclined plate.

* * * * *